United States Patent [19]
Ertel

[11] Patent Number: 4,566,892
[45] Date of Patent: Jan. 28, 1986

[54] METHOD FOR FORMING GLASS TO METAL SEALS IN STRUCTURAL MEMBERS

[75] Inventor: Gerhard Ertel, Tienfenbach, Fed. Rep. of Germany

[73] Assignee: Schott Glaswerke, Mainz, Fed. Rep. of Germany

[21] Appl. No.: 660,187

[22] Filed: Oct. 12, 1984

[30] Foreign Application Priority Data

Oct. 12, 1983 [DE] Fed. Rep. of Germany ....... 3337037

[51] Int. Cl.$^4$ .............................................. C03C 29/00
[52] U.S. Cl. .................... 65/59.24; 65/59.34; 65/59.4
[58] Field of Search ................. 65/59.24, 59.25, 59.34, 65/59.4, 154

[56] References Cited

U.S. PATENT DOCUMENTS

| | | | |
|---|---|---|---|
| 2,992,513 | 7/1961 | Breadner | 65/154 X |
| 3,107,757 | 10/1963 | Breadner | 65/59.34 X |
| 3,427,703 | 2/1969 | Baade | 65/59.4 X |
| 3,770,568 | 11/1973 | Graff et al. | 65/59.34 X |
| 4,377,404 | 3/1983 | Hoshikawa et al. | 65/59.25 X |

*Primary Examiner*—Robert Lindsay
*Attorney, Agent, or Firm*—Millen & White

[57] ABSTRACT

A baseplate is made up of a metal stamped eyelet for the production of glass to metal seals. The baseplate has bores for accommodating respective metallic leads and insulating glass beads. The bores have on their inner walls abutments arranged at the lower rim of the bore, which abutments can consist of integrally formed notches, protrusions or projections, or can be of an annular shape, thereby preventing sagging through of the normally cylindrical glass bead when melted during sealing of the glass onto the conductor and into the bore.

16 Claims, 5 Drawing Figures

METHOD FOR FORMING GLASS TO METAL SEALS IN STRUCTURAL MEMBERS

BACKGROUND OF THE INVENTION

This invention relates to glass to metal seals for use in the hermetic encapsulation of active and passive components in electrical engineering and electronics. These units are typically made out of metal (baseplate) having one or several bores for accommodating sealing glass performs and lead-through conductors of a metal alloy more or less dilathermally matched to the sealing.

All members are fused hermetically to form a matched or compression glass to metal seal.

In FIG. 1 there is schematically illustrated a conventional glass to metal seal of the type discussed above, and wherein 1 denotes the baseplate, 2 denotes the conductor or wire lead, and 3 denotes the insulating glass.

In the prior art, in order to fuse the conductor into the bore of the baseplate, all parts are supported on a graphite plate and then subjected to a heat treatment in an appropriate furnace in a protective or inert gas environment. During this process, the glass is softened, fills the bores fully, and bonds with the metals of the baseplate and the lead-in wire to form a hermetic seal.

However, in this method of manufacture and construction it is also generally unavoidable to have the glass bead employed, as a result of sagging, come into contact with the supporting plate of graphite. This is caused by gravity and as a result, loose carbon particles become incorporated into the glass surface or become attached thereto during the fusing or melting step. Hereinafter the terms "fusing" and "melting" will be used interchangeably and will refer to the melting and bonding of the glass insulator within the baseplate bores. Incorporated or adherent graphite particles can cause problems in certain specific applications, for example, when the glass to metal seals are nickel-plated, because electro-deposited metallic particles can attach themselves to the graphite particle thereby impairing the electrical properties of the glass to metal seal (flash over voltage, insulating resistance).

Attempts have been made to avoid this sagging through of the normally cylindrical sintered glass bead by providing the bead with a collar to fix or hold the bead in position during the fusion process until it has bonded to the metal wall. The adherence of the glass bead at the edge of the eyelet bores hinders the softened glass to sag totally in the bore and thus a direct contact of the glass with the graphite surface is avoided. Such a modification is shown in FIG. 2, wherein 4 denotes the graphite plate and 5 denotes the glass bead with a collar.

This manufacturing method, however, also has disadvantages. Two serious disadvantages in this method are:
1. A collared bead is more difficult to produce than a cylindrical glass bead; and
2. The use of the collared bead requires a special alignment procedure during assembly which creates difficulties especially in automated assembly installations.

SUMMARY OF THE INVENTION

It is thus an object of the present invention to provide a baseplate for the production of glass to metal seals which does not exhibit the above-discussed disadvantages.

Upon further study of the specification and appended claims, further objects and advantages of this invention will become apparent to those skilled in the art.

In accordance with the invention the above discussed disadvantages are avoided by providing a special baseplate for the production of glass to metal seals.

The invention provides a baseplate of a glass to metal seal which is a stamped eyelet having bores for accommodating the metallic conductors or lead-in wires and the glass preform as insulated which is to be fused and bonded into the bores to form a hermetic seal. The improvement resides in that the baseplate includes on the inner walls of the bores an abutment at a location for holding the glass beads inserted within the bores of the bases to hold the glass beads in position during melting and bonding to prevent the glass melt from sagging through.

In a more specific aspect, the abutment is located near the lower rim of the bores. These abutments are typically stop notches, protrusions or projections and are preferably integrally formed during production as one part of the baseplate for reasons of economy.

Alternatively, the abutments are annular in shape.

Preferably, three stop notches, protrusions or projections are provided equally spaced about the bore.

The invention, therefore, avoids the aforedescribed disadvantages by, in one aspect as discussed, integrally forming the abutment in the bores of the baseplate during production thereof. The abutment prevents the cylindrical glass preform from falling through onto the graphite plate during assembly and thus coming into contact with the graphite plate. Instead, the glass bead is always maintained at a certain minimum distance from the graphite plate, even during sealing, so that the glass fuses and bonds homogenously to the metallic partners, i.e., lead-in wire and to the walls of the bores.

The forming of the abutment can be done in any desired manner. Typically, the abutment is made during the manufacture of the punched part, i.e., by conventional stamping methods.

This abutment can, as already discussed, be of annular shape, or it can consist of stop notches, protrusions or projections, and the number of notches, protrusions or projections is not critical since even single notches, protrusions or projections can provide the desired function. However, as noted, preferably three notches, protrusions or projections are arranged at the lower part of the bore since this has proven to be the most favorable arrangement.

BRIEF DESCRIPTION OF THE DRAWINGS

Various other objects, features and attendant advantages of the present invention will be more fully appreciated as the same becomes better understood when considered in conjunction with accompanying drawings, in which like reference characters designate the same or similar parts throughout the several views, and wherein.

DETAILED DISCUSSION OF THE INVENTION

Figure 1:
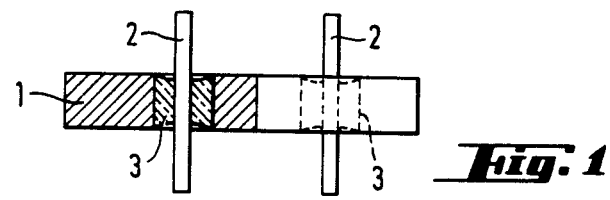
FIG. 1 is a schematic cross-sectional diagram of conventional prior art lead-in wire assembly.
Figure 2:
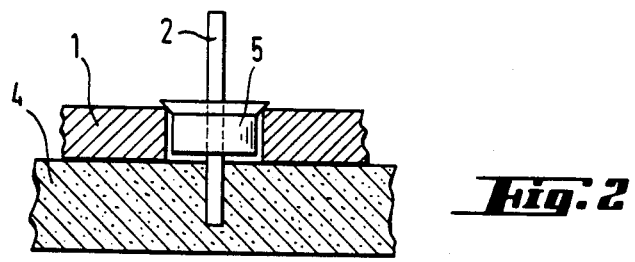
FIG. 2 is a schematic diagram of an alternative prior art lead-in wire assembly constructed to prevent sagging of the insulating glass bead onto the graphite support plate during sealing.
Figure 3:
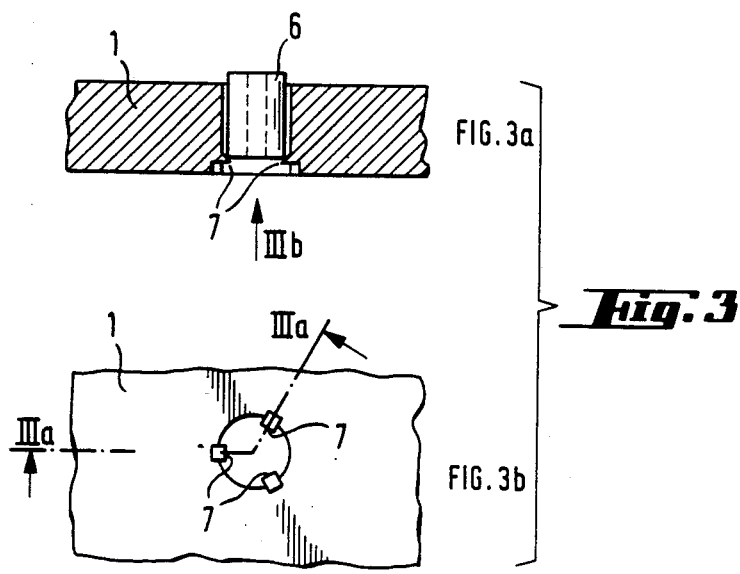
FIG. 3a is a side cross-sectional view of the baseplate of FIG. 3b taken along lines IIIa—IIIa of FIG. 3b.
FIG. 3b is a view from the bottom of a bore in a partial view of the baseplate of one embodiment of the assembly of the invention.

One embodiment of the invention is illustrated in the FIGS. 3a and 3b. FIG. 3a shows the metallic baseplate 1 in a sectional view with the cylindrical glass bead 6 inserted in the bore. The glass bead 6 rests on stop notches, protrusions or projections 7. Typically the number of notches, protrusions or projections is three and are equally spaced about the circumference of the bore FIG. 3b shows a bottom view of the same baseplate of FIG. 3a, but without the inserted glass bead 6. In this embodiment, as discussed above, the notches, protrusions or projections are equally spaced about the circumference of the bore. Alternatively, an annular member may be used. In essence, the diameter of the bore is reduced at a location spaced from one side of the baseplate 1.

Figure 4:
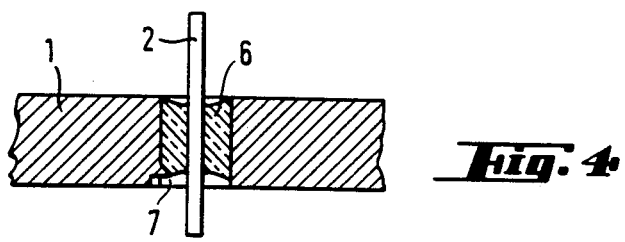
FIG. 4 is a side cross-sectional diagrammatical view of another embodiment of the invention.

FIG. 4 there is shown an alternative embodiment with only one notch, protrusion or projection. The fusing of the glass has already occurred in this embodiment. As is evident from this embodiment, in many cases one abutment will suffice to prevent the sagging.

In essence, the baseplate 1 serves as a mounting member for the glass-to-metal seal which is formed at the interfacing surfaces of the bore, glass 3 and conductor 2. The method is of special interest when forming glass-to-metal seals with structural members or baseplate which are nickle plated.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of locating a conductor in a bore through a metallic structural member, with a glass-to-metal seal between the interfacing surfaces of the bore, glass and conductor, the method comprising the steps of:
   (a) providing a glass bead of a diameter less than the bore through the metallic structural member;
   (b) surrounding the conductor with the glass bead;
   (C) keeping the glass bead from touching the metallic structural member by decreasing the diameter of the bore at the location spaced from one side of the metallic structural member to a diameter less than that of the bead;
   (d) orienting the metallic structural member with said one side facing downwardly;
   (e) inserting the glass bead in the bore;
   (f) abutting the bead with the reduced diameter portion of the bore;
   (g) performing steps (a)–(f) to form an assembly of the metallic structural member, glass bead and conductor;
   (h) heating at least the glass bead of the assembly to a temperature sufficient to fuse the bead to the surface of the bore; and
   (i) allowing the glass to cool so as to form the glass to metal seal.

2. The method of claim 1 wherein step (a)–(g) are performed in any convenient order before performing steps (h) and (i).

3. The method of claim 2 wherein the bore and bead are cylindrical with the bead having a constant diameter.

4. The method of claim 3 wherein the reduced diameter portion is formed by at least one projection which projected into the bore.

5. The method of claim 4 wherein the reduced diameter portion is formed by a plurality of projections.

6. The method of claim 5 wherein the plurality of projections are equally spaced around the bore.

7. The method of claim 3 wherein the metallic structural member is a baseplate.

8. The method of claim 3 wherein the reduced diameter portion is annular in shape.

9. The method of claim 2 wherein the reduced diameter portion is formed by at least one projection which projects into the bore.

10. The method of claim 2 wherein said one side of the metallic structural member is free and unabutted by another structure in areas aligned with the bore during the performance of step (h).

11. The method of claim 3 wherein the step of heating at least the glass bead also fuses the glass bead to the conductor.

12. The method of claim 3 wherein the entire assembly is heated in an inert atmosphere to form a glass-to-metal seal with the surface of the conductor as well as the surfaces to the bore.

13. The method of claim 1 wherein the structural member is plated with nickle.

14. The method of claim 1 wherein step (h) is performed while the assembly is stationary.

15. The method of claim 1 wherein step (d) is performed with the conductor extending substantially vertically at least over that portion of the length thereof in contact with the glass bead.

16. The method of claim 1 wherein the glass bead directly contacts the conductor.

* * * * *